United States Patent [19]

Hori et al.

[11] Patent Number: 4,614,856

[45] Date of Patent: Sep. 30, 1986

[54] HOT-WIRE TIG WELDING APPARATUS

[75] Inventors: Katsuyoshi Hori; Takeshi Kagawa; Kazuki Kusano; Toshiaki Takuwa, all of Kure, Japan

[73] Assignee: Babcock-Hitachi Kabushiki Kaisha, Tokyo, Japan

[21] Appl. No.: 658,168

[22] Filed: Oct. 5, 1984

[30] Foreign Application Priority Data

Oct. 7, 1983 [JP] Japan .................. 58-186998

[51] Int. Cl.⁴ .............................................. B23K 9/10
[52] U.S. Cl. .......................... 219/130.21; 219/130.51; 219/137.71; 219/137 PS
[58] Field of Search ...................... 219/130.21, 137.71, 219/137 PS, 130.51, 130.33

[56] References Cited

U.S. PATENT DOCUMENTS

| 4,456,813 | 6/1984 | Mizuno et al. | 219/137 PS |
| 4,456,814 | 6/1984 | Mizuno et al. | 219/137.71 |
| 4,467,176 | 8/1984 | Mizuno et al. | 219/137.71 |
| 4,485,293 | 11/1984 | Tabata et al. | 219/137 PS |

OTHER PUBLICATIONS

J. F. Saenger et al, "High Deposition Gas Tungsten-Arc Welding", 5/1968.

Primary Examiner—Clifford C. Shaw
Attorney, Agent, or Firm—Antonelli, Terry & Wands

[57] ABSTRACT

A hot-wire TIG welding apparatus capable of performing a stable welding regardless of change in the welding conditions. The welding apparatus comprises a hot-wire feed speed control means for controlling the speed of feed of a hot wire, and a heating power control means adapted to control the electric power for heating the hot wire. The condition of the control in either one of the control sections is changed in accordance with a change in the control condition of the other.

9 Claims, 9 Drawing Figures

HOT-WIRE TIG WELDING APPARATUS

The present invention relates to a hot-wire TIG welding apparatus (that is, a hot-wire inert gas tungsten arc welding apparatus) and, more particularly, to a hot-wire TIG welding apparatus which can ensure a good quality of welding regardless of the change in the welding condition.

FIG. 1 schematically shows the circuit arrangement of a typical conventional hot-wire TIG welding apparatus. This apparatus has a D.C. arc power source 3 connected to both a tungsten electrode 1 and a base metal 2. In operation, an arc 4 is formed within the atmosphere of an argon shield gas between the tungsten electrode 1 serving as a negative electrode and the base metal 2 serving as a positive electrode. On the other hand, a welding wire is fed by a wire feeder 6 through a conduit 7 and a contact tip 8 connected to the conduit, and the welding wire is then placed into contact with the base metal 2 through the arc. Meanwhile, a D.C. current or an A.C. current is supplied to the wire 5 by a wire heating power source 9 connected between the contact tip 8 and the base metal 2 so as to generate Joulé heat in the wire 5 thereby promoting the melting of the wire 5.

In this welding method, the amount of heat necessary for heating the wire from the room temperature until the wire is melted is a physical value which is peculiar to the material of the wire if a small amount of heat loss is neglected. For instance, in the case of a welding wire made of a mild steel, the amount of heat required for heating and melting the wire is 1.270 J/g. This suggests that the amount of heat to be inputted for heating and melting the wire is determined if the wire feed speed is given. From this point of view, it is desirable to use, as the wire heating power source, a constant-power type power source which can supply a constant electric power commensurate with the wire feed speed. However, it has been considered quite difficult to realize a wire heating power source of constant power type and no discussion has been made up to now for putting this type of power source into practical use.

Therefore, in the hot-wire TIG welding, it has been a common practice to use a constant-voltage type power source capable of applying a constant voltage commensurate with the wire feed speed. The amount of heat generated in the wire is given as follows:

(voltage applied)$^2$/(electric resistance value of wire)

The electric resistance value of the wire is varied by factors which include not only the material and the diameter of the wire but also the wire feed speed and the length of extension of the wire, i.e., the length of the wire end extended from the contact tip to the base metal. In the practical hot-wire TIG welding, the material length of the wire extension is varied momentarily due to various reasons such as vibration and twisting of the welding torch, variation in the height of the bead, variation in the position of contact between the contact tip and the wire, and so forth. Consequently, the electric resistance value of the wire is fluctuated to make the welding unstable.

Namely, the fluctuation in the electric resistance value of the wire, as well as error in the setting of the voltage to be applied, often causes a difference between the amount of heat actually generated and the desired amount of heat. If the difference is below a certain value, it would be automatically compensated for through a change in the length of the solid portion of the wire before entering the weld puddle or by a plastic deformation of the softened wire end. However, if the diffence exceeds the value, the welding is impaired due to strong abutting of the solid wire to the base metal or a formation of an arc due to separation of the wire from the base metal as a result of a small wire feed rate. This problem is serious particularly when the welding is conducted at a high wire feeding speed of 20 g/min or above.

Another problem encountered in hot-wire welding is that the welding is hindered by a disturbance of the arc caused by a phenomenon generally referred to as "magnetic blow" caused by a mutual magnetic interference between the arc current and the wire heating current particularly when the latter is increased.

In order to obviate this problem, a method has been proposed in which, as shown in FIG. 2, the power is supplied by switching alternatingly to the arc and to the wire. Namely, the power supply to the wire is suspended during the peak current period $T_1$ of the arc current but is conducted only in the base current period $T_2$ in which the arc current is maintained at a base level $I_{AB}$ necessary for maintaining the arc, so that the magnetic blow of the arc is materially eliminated. This method is referred to as "hot-wire switching TIG welding method" and has been put into practical use.

This hot-wire switching TIG welding method, however, still suffers from the following problem. Namely, this method requires a dropper-type power source employing transistors of large capacities or a switching-regulator-type power source which also employs transistors of large capacities. These power sources are expensive and impractically large in size. In addition, the following problem is encountered even when the expensive high-grade power source is used. Namely, since the control employed conventionally for this method is merely to maintain a constant voltage of wire heating power by controlling the voltage in proportion to the wire feed speed, the automatic control of the wire heating current commensurate with the wire feed speed is often failed when the factors such as length of the wire extension, arc current, wire current switching frequency, peak value, period of power supply and so forth are widely changed in accordance with the change in the welding object. Consequently, a frequent manual readjustment becomes necessary during the welding in the conventional technique.

Accordingly, an object of the invention is to provide a hot-wire TIG welding apparatus which permits a stable welding operation despite wide variation in the welding conditions.

To this end, the invention provides a hot-wire TIG welding apparatus in which either one of the wire feed speed and the wire heating electric power is changed in response to a change in the other.

More specifically, according to the invention, there is provided a hot-wire TIG welding apparatus comprising: hot-wire feed speed control means for controlling the speed of feed of a hot wire; and heating power control means adapted to control the electric power for heating the hot wire; wherein the condition of the control in either one of the control sections is changed in accordance with a change in control condition of the other.

The above and other objects, features and advantages of the invention will become clear from the following description of the preferred embodiments taken in conjunction with the accompanying drawings.

Figure 1:
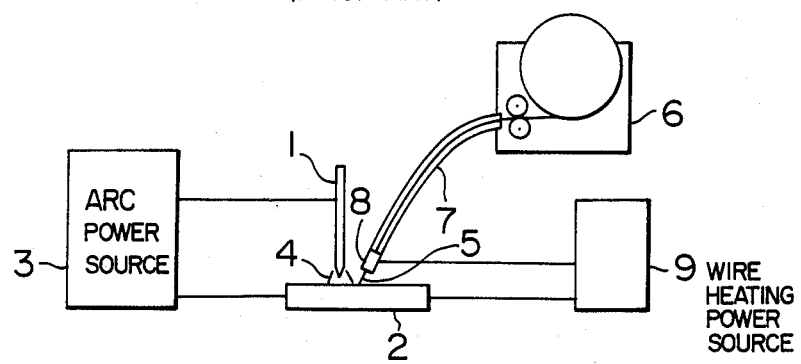
FIG. 1 is a schematic illustration of a conventional hot-wire TIG welding apparatus.
Figure 2:
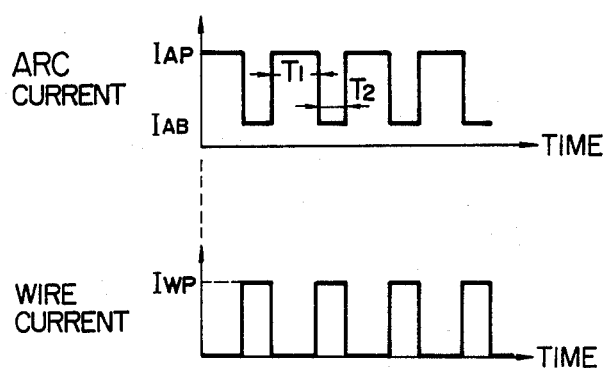
FIG. 2 is an illustration of waveforms of arc current and wire current in a conventional hot-wire switching TIG welding.
Figure 3:
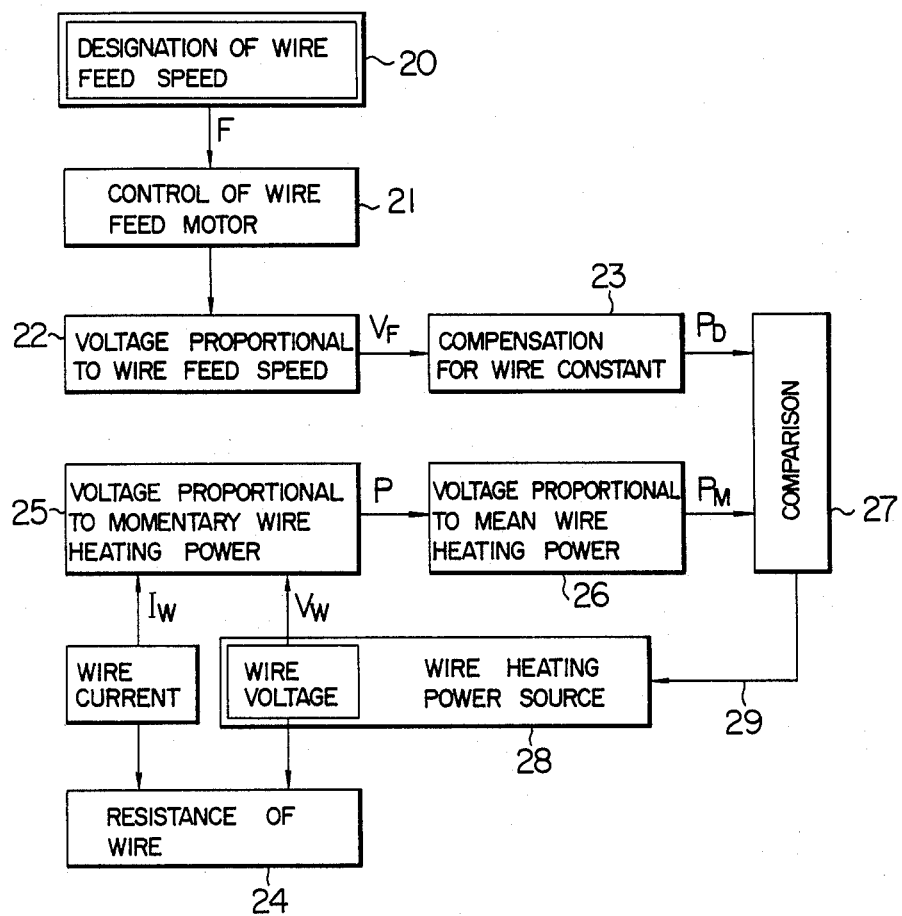
FIG. 3 is a flow chart showing the principle of a wire heating controller incorporated in a hot-wire TIG welding apparatus as a first embodiment of the invention.

A flow chart illustrating the operation of a first embodiment is shown in FIG. 3.

In hot-wire TIG welding, basically, the operator controls the state of melting of the base metal through a control of the TIG arc current, while the amount of deposited metal is controlled independently of the state of melting of the base metal by varying the feed speed of the hot wire and voltage or current of the wire heating power. That is, the arc current and the rate of deposited metal (, i.e., the wire feed speed,) are factors independent of each other.

Referring to FIG. 3 illustrating a practical welding process, the wire feed speed F optimum for the condition of the welding object is selected in a step 21 by the operator through manual selection of the speed of a variable-speed wire feed motor or, alternatively, by a programmed wire feed control output. The speed of the wire feed motor is controlled in a step 21 in accordance with the selected wire feed speed F, and a voltage $V_F$ proportional to the feed speed is detected in a step 22 by, for example, a tachometer. Alternatively, the voltage $V_F$ proportional to the wire feed speed is obtained directly from the signal provided by selecting the wire feed speed.

The voltage $V_F$ thus obtained has to be compensated in view of the factors which are physical values concerning the wire such as the wire diameter, electric wire resistance value, amount of heat to be inputted for melting, and so forth. Therefore, in a step 23, a compensation is made by multiplying the wire feed speed by a compensation factor, thereby obtaining a voltage $P_D$ proportional to the power required.

On the other hand, a voltage $V_W$ is applied between the contact tip and the base metal by a wire heating power source 28, so that a wire heating current $I_W$ of a level determined by the resistance 24 of the wire flows in the wire. This wire current $I_W$ is detected by means of, for example, a shunt and the wire voltage $V_W$ is multiplied by the wire current $I_W$ to obtain a product which represents the momentary wire heating electric power, and a voltage P proportional to this power is formed in a step 25. This voltage proportional to the momentary electric power is supplied to an averaging circuit 26 to obtain a voltage $P_M$ proportional to the average wire heating power. Then, in a step 27, the voltage $P_M$ is compared with a value $P_D$ which represents the electric power necessary for melting the wire, and the difference is fed-back in a step 29 to the output voltage of the wire heating power source 28. Consequently, wire heating heat input commensurate with the wire feed speed is maintained automatically.

According to another method of detecting the actual wire heating heat input, the magnetic field produced by the wire current and the voltage applied to the terminal of the wire are applied to a hall device so that the hall device directly produces a voltage which is proportional to the momentary electric power, and the thus produced voltage is then inputted to the averaging circuit which produces the voltage $P_M$ for the comparison. The term "hall device" is used here to mean an element which produces a hall effect, i.e., an effect in which, when an electric current I flows in a X-direction in a tabular elongated conductor under application of a magnetic field (H) perpendicular to the current (I), an electromotive force is produced in a Y-direction perpendicular to the directions I and H.

Figure 4A:
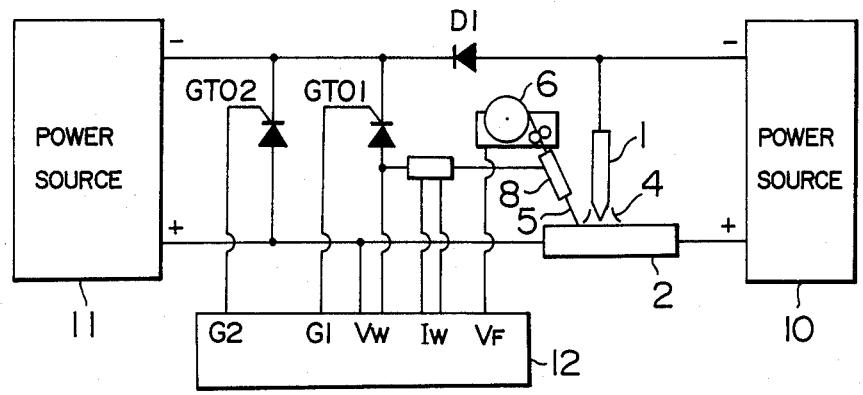
FIG. 4A is a block diagram of the hot-wire switching TIG welding apparatus incorporating the wire heating controller as shown in FIG. 3.

FIG. 4A shows an apparatus embodying the present invention. This apparatus has a power source unit which is constituted by power source units 10, 11 having constant-voltage characteristics used in ordinary arc generating devices, switching elements constituted by gate turn-off thyristors GTO1 and GTO2, and a wire heating controller 12 having the above-described control circuit.

Figure 4B:
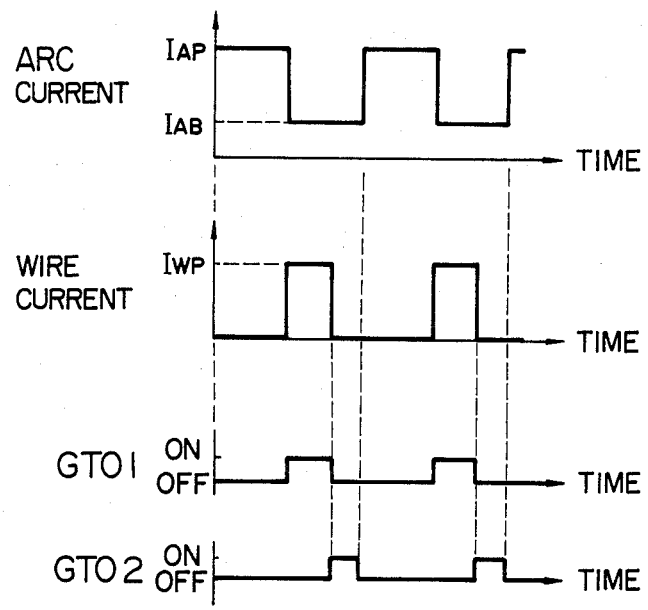
FIG. 4B is a diagram showing waveforms of arc current and wire current, as well as the on-off states of thyristors in the apparatus shown in FIG. 4A.

The power source 10 is adjusted to provide the base current $I_{AB}$ (see FIG. 4B) necessary for maintaining the arc 4, while the power source 11 is adjusted to provide an arc peak current $I_{AP}$ which is to be lapped to the base current $I_{AB}$. A symbol DI represents a diode which separates the power source 10 from the wire heating circuit. The reference voltage $P_D$ (see FIG. 3) is provided in the wire heating controller 12 in conformity with the wire feed speed VF detected from the wire feeder 6. When the arc peak current is being supplied, both the gate turn-off thyristors GTO1 and GTO2 are turned off. However, when the period of the base arc current is commenced, the thyristor GTO1 is turned on to allow the current which constituted peak arc current to flow to the wire 5. During this period, the wire current $I_W$ and the wire voltage $V_W$ are detected and, when the wire heating power $P_M$ per one pulse has reached a level which is determined by the reference voltage $P_D$, the thyristor GTO1 is turned off simultaneously with turning on of the thyristor GTO2, thereby making the value of wire current $I_W$ to be zero. Thereafter, the GTO2 also is turned off to initiate the period of the peak arc current. In this Figure, a symbol G is used to represent the gates.

Using this welding apparatus, a test welding was conducted under welding conditions as shown in Table 1. Throughout the welding, the wire feed speed was varied within the range of between 0 and 40 g/min but the welding could be conducted satisfactorily through automatic control of the wire feed speed and the wire current in relation to each other without necessitating any manual adjustment.

In another test, the wire diameter was changed to 1.6 mm, while, in still another test, the wire material was changed to stainless steel. In either case, the welding was conducted satisfactorily without any adjustment, once the operating condition was optimized by means of a compensation dial regarding wire constant which dial is provided on the wire heating controller when the state of a test arc is generated prior to the actual welding.

It was confirmed also that the wire feed can be smoothed if the averaging for determination of the voltage $P_M$ proportional to the wire heating mean power is conducted with a time constant three times than that of the switching period.

TABLE 1

| | |
|---|---|
| arc peak current | 350 A |
| base current | 50 A |
| ratio of peak period | 70% |
| switching frequency | 100 Hz |
| wire feed speed | 0 to 40 g/min |
| wire material and da. | mild steel, 1.2 mm |
| welding speed | 150 mm/min |

Figure 5:
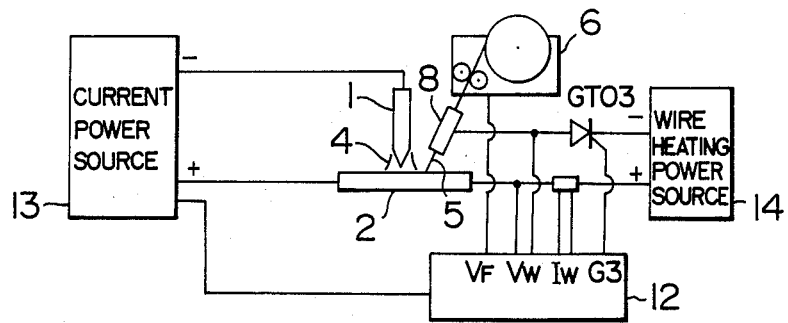
FIG. 5 is a block diagram of a hot-wire switching TIG welding apparatus which is a second embodiment of the invention.

In another embodiment shown in FIG. 5, the switching between the peak period and the base period of the arc current is conducted at a frequency not higher than 10 Hz by a gate phase control which uses, as the arc power source, a constant current power source 13 employing an SCR controller (silicon controlled rectifier) ordinarily used in TIG welding. On the other hand, the wire heating power source 14 is constituted by a constant-voltage type power source, the power from which is controlled by a gate turn-off thyristor GTO3 which in turn is controlled by a wire heating controller 12, thus conducting the hot-wire switching TIG welding.

Figure 6:
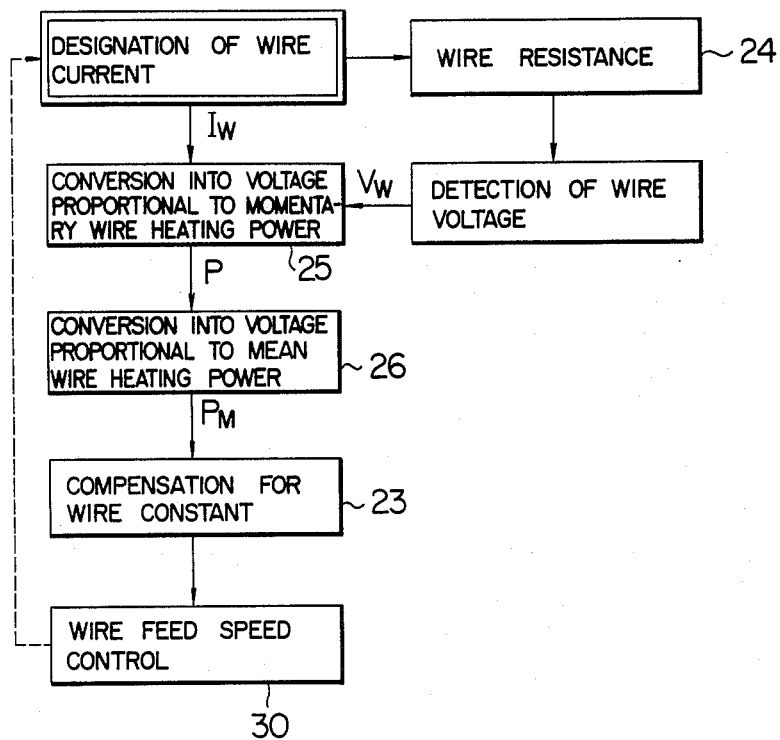
FIG. 6 is a flow chart illustrating the operation of a third embodiment of the invention.

FIG. 6 shows still another embodiment in which the wire feed speed is controlled as at 30 in accordance with the mean value of the wire heating power. Actually, the operator controls the wire current while watching the wire feed speed which is changed as a result of the above-mentioned control, so that an effect equivalent to that shown in FIG. 3 is obtained.

Figure 7A:
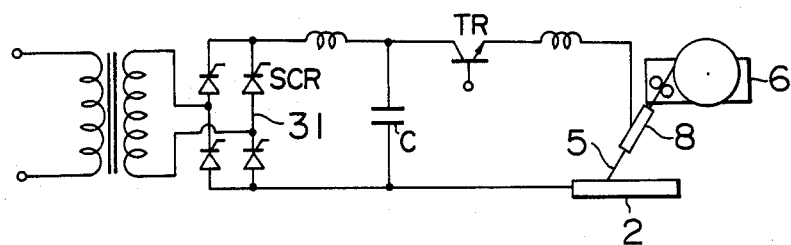
FIG. 7A is a block diagram of a hot-wire switching TIG welding apparatus constructed to perform the operation shown in the flow chart of FIG. 6.
Figure 7B:
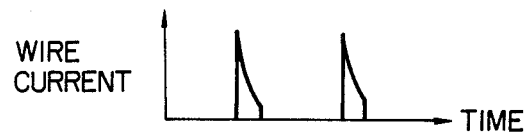
FIG. 7B is a waveform chart showing the state of discharge from a capacitor in the apparatus shown in FIG. 7A.

FIG. 7A shows a practical example of a wire heating circuit constructed to carry out the operation in the flow chart shown in FIG. 6. In this circuit, the heating of the hot wire is conducted by a current discharged from a capacitor C which is controlled by a switching transistor TR of a large current type adapted to be maintained in the "on" state for a predetermined period. The voltage for charging the capacitor C is controlled by means of an SCR bridge 31. Therefore, the operator controls primarily the charging voltage so that the discharge current, i.e., the wire heating power is controlled as a result, and the wire is fed at a speed commensurate with the thus controlled wire heating power. In this circuit, the capacitor C discharges current repeatedly as shown by waveform chart in FIG. 7B. In this embodiment, because of the use of the discharge current from a capacitor, the capacity of the circuit including the transformer and the capacitor can be made small advantageously.

Although the invention has been described through specific reference to hot-wire switching TIG welding in which the heating power supply to the hot wire is conducted intermittently, the invention is not limited to this type, and the invention can be also applied similarly to ordinary hot-wire TIG welding in which the wire heating current is continuously supplied.

The invention offers the following advantages. First of all, it is to be pointed out that the invention makes it possible to construct inexpensive and rational electronic circuits for the detection of and the control of the electric power even in a hot-wire switching welding apparatus which specifically requires a complicated control of the power. These circuits in turn permits a control of the welding independently of the waveform of the wire heating current. In addition, the circuit for switching the large arc current, which tends to become expensive and large in size, can be made very cheap and small in size.

It is to be noted also that the welding operation is highly stabilized because any change attributable to a change in the factors such as the length of the wire extension and a resultant change in the electric resistance value in the wire is automatically compensated for.

Furthermore, since the wire heating current and the wire feed speed are controlled in such a way that one of them is controlled in response to a change in the other, the operator can conduct the welding quite easily because he can control the TIG arc for melting the base metal and the amount of deposited metal as if both the TIG arc and the amount of deposited metal were independent of each other.

Although the invention has been described through specific embodiments, it is to be noted here that the described embodiments are only illustrative and various changes and modifications may be imparted thereto without departing from the scope of the invention which is limited solely by the appended claims.

What is claimed is:

1. In a hot-wire TIG welding apparatus, the improvement comprising:

hot-wire feed speed control means for controlling the speed of feed of a hot-wire, said hot-wire feed speed control means providing a reference voltage value corresponding to the feed speed of the hot-wire;

heating power control means for controlling the electric power for heating the hot-wire, said heating power control means including detector means for detecting wire-heating instantaneous electric power and providing an actual voltage value corresponding to the instantaneous wire-heating power; and change means responsive to at least a change in said reference voltage value with respect to said actual voltage value for controlling said heating power control means in accordance therewith.

2. A hot-wire TIG welding apparatus according to claim 1, wherein said change means includes means responsive to the actual voltage value corresponding to the instantaneous wire-heating power for forming a mean voltage value of the wire-heating power, said change means controlling said heating power control means to effect a change in the mean voltage of the wire-heating power.

3. A hot-wire TIG welding apparatus according to claim 1, further comprising a switching circuit for effecting a switching between the arc current and the wire heating current, said change means including a circuit for detecting the actual voltage value corresponding to the instantaneous wire-heating power and averaging the detected actual value with an averaging circuit having a time constant three times larger than that of the switching period of said switching circuit so as to provide a voltage proportional to the wire-heating power.

4. A hot-wire TIG welding apparatus according to claim 1, wherein said change means is responsive to said reference voltage value and said actual voltage value for effecting a comparison thereof and for controlling said heating power control means in accordance with the results of the comparison.

5. A hot-wire TIG welding apparatus according to claim 4, wherein said change means includes means responsive to the actual voltage value for forming a mean voltage value of the wire-heating power and means for compensating the reference voltage value in accordance with a wire constant, and comparison means for effecting a comparison of the compensated reference voltage value and the mean voltage value and for controlling the heating power control means in accordance with the results of the comparison.

6. In a hot-wire TIG welding apparatus, the improvement comprising:
hot-wire feed speed control means for controlling the speed of feed of a hot wire;
detector means for detecting wire-heating instantaneous electric power and providing an actual voltage value corresponding to the instantaneous wire-heating power; and
change means responsive to a change in said actual voltage value for controlling said hot-wire feed speed control means in accordance therewith.

7. A hot-wire TIG welding apparatus according to claim 6, wherein said change means controls said hot-wire feed speed control means to effect a change of the hot-wire feed speed in response to the amount of change in said actual voltage value.

8. A hot-wire TIG welding apparatus according to claim 6, wherein said change means includes means responsive to said actual voltage value for forming a mean voltage of the wire-heating power, said change means controlling said hot-wire feed speed control means for effecting a change in the hot-wire feed speed in response to the amount of change in the means voltage of the wire-heating power.

9. A hot-wire TIG welding apparatus according to claim 8, wherein said change means further includes means for compensating the mean voltage of the wire-heating power in accordance with a wire constant, said change means controlling said hot-wire feed speed control means for effecting a change in the hot-wire feed speed in response to the amount of change in the compensated mean voltage of the wire-heating power.

* * * * *